United States Patent
Lee et al.

[11] Patent Number: 5,566,166
[45] Date of Patent: Oct. 15, 1996

[54] NETWORK TERMINAL APPARATUS

[75] Inventors: Young Dae Lee; Sang Rae Lee, both of Kyeongki-do, Rep. of Korea

[73] Assignee: Hyundai Electronics Ind., Kyeongki-do, Rep. of Korea

[21] Appl. No.: 246,217

[22] Filed: May 19, 1994

[30] Foreign Application Priority Data

May 20, 1993 [KR] Rep. of Korea .................. 93-8669

[51] Int. Cl.⁶ .................................................. H04J 15/00
[52] U.S. Cl. ........................................... 370/32; 370/110.1
[58] Field of Search ............................. 370/32, 32.1, 13, 370/110.1, 123, 94.1, 60

[56] References Cited

U.S. PATENT DOCUMENTS

| | | | |
|---|---|---|---|
| 4,262,283 | 4/1981 | Chamberlain et al. | 370/123 |
| 4,592,045 | 5/1986 | Fundneider | 370/110.1 |
| 4,866,703 | 9/1989 | Black et al. | 370/110.1 |
| 5,157,665 | 10/1992 | Fakhraie-Fard et al. | 370/13 |
| 5,353,305 | 10/1994 | Fukuda et al. | 370/32.1 |

*Primary Examiner*—Douglas W. Olms
*Assistant Examiner*—Shick Hom
*Attorney, Agent, or Firm*—Wenderoth, Lind & Ponack

[57] ABSTRACT

This invention relates to a network terminal apparatus in ISDN for connecting a two-wire U-interface on the switchboard side and a four-wire S-interface on the terminal side to each other. A network terminal apparatus disclosed for causing signals from the switchboard or the terminal to enable or disable the circuitries in the periphery of transmission/reception means of S- and U-interfaces, thus dispensing with use of a microprocessor and notifying the user of the status by LED display means. It comprise U-interface means connected to a switchboard for transmitting/receiving channel data 2B+D as a reference transmission rate, S-interface means connected to a terminal for transmitting/receiving channel data 2B+D, a status display for displaying activation status of the system, and electric supply means for supplying a regular and backup source, and reset means for performing a system resetting action.

6 Claims, 5 Drawing Sheets

FIG. 6
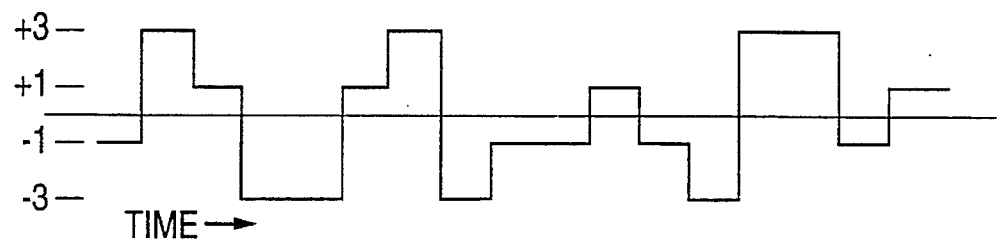
FIG. 7(A)
FIG. 7(B)
FIG. 7(C)
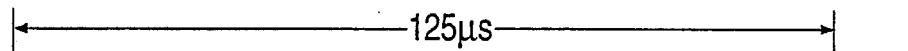
FIG. 7(D)
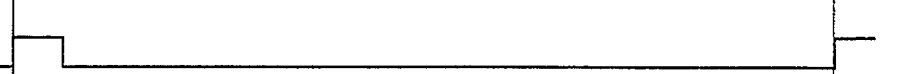

NETWORK TERMINAL APPARATUS

FIELD OF THE INVENTION

This invention relates to a network terminal apparatus in ISDN or integrated services digital networks, for connecting a two-wire U-interface on the switchboard side and a four-wire S-interface on the terminal side to each other.

BACKGROUND OF THE INVENTION

A terminal apparatus must be connected in a communication network or a switchboard in order to provide a variety of services relating to data, voices, etc. in ISDN. Functionalities should be defined in the process of terminal-switchboard connection. To this end, CCITT proposed connection functional structure between the subscription area and network where U-interface provides interface connection between existent subscribers and network, and S-interface provides that between terminals and network.

Conventional network terminals adopted a microprocessor for activation/non-activation, maintenance and repair and indication of the status of the system components. It should be pointed out that a separate power supply network had to be provided for energizing the network interface apparatus. Such conventional network terminal apparatus had the drawbacks that the use of a microprocessor make the system design complicated and costly and that stoppage of a regular power supply prevented the system from providing the services.

SUMMARY OF THE INVENTION

In order to eliminate the above stated drawbacks, the invention has it as one object to provide a network terminal apparatus disclosed for causing signals from the switchboard or the terminal to activate or non-activate the circuitries in the periphery of transmission/reception means of S- and U-interfaces, thus dispensing with use of a microprocessor and notifying the user of the status by LED display means. The other object of the invention is to provide a network terminal apparatus where power supply can be maintained after an emergent stoppage of a regular power supply by means of a backup power supply unit substituting for a network power supply. According to the invention provided is a network terminal apparatus for ISDN which comprises U-interface means connected to a switchboard for transmitting/receiving two B and one D channel data, S-interface means connected to said U-interface means for transmitting/receiving said channel data, a status display unit connected to said U- and S-interface means for displaying activation/non-activation status of the system, a terminal connected to said S-interface means, and reset means connected to said U- and S-interface means for performing resetting operations.

BRIEF DESCRIPTION OF THE DRAWINGS

FIG. 6 shows a waveform chart of a 2-binary-1-quaternary line coding operation. FIG. 7 shows a timing chart of FIG. 4. Reference numeral 100 in Figures designates U-interface means; 200, S-interface means; 300, status display unit; 400, power source supply means; 500, reset means; 110, U interface transmitting/receiving means; 120, a hybrid 220; an overvoltage protection circuit; 250, a selection switch; 310–312, first, second and third shift registers; 320, 321, a first and second decoders; 410, an AC/DC convertor; 420, a DC/AC convertor; 430, a battery charger; 440 a backup battery; 450, a relay.

DETAILED DESCRIPTION OF THE PREFERRED EMBODIMENT

Figure 1:
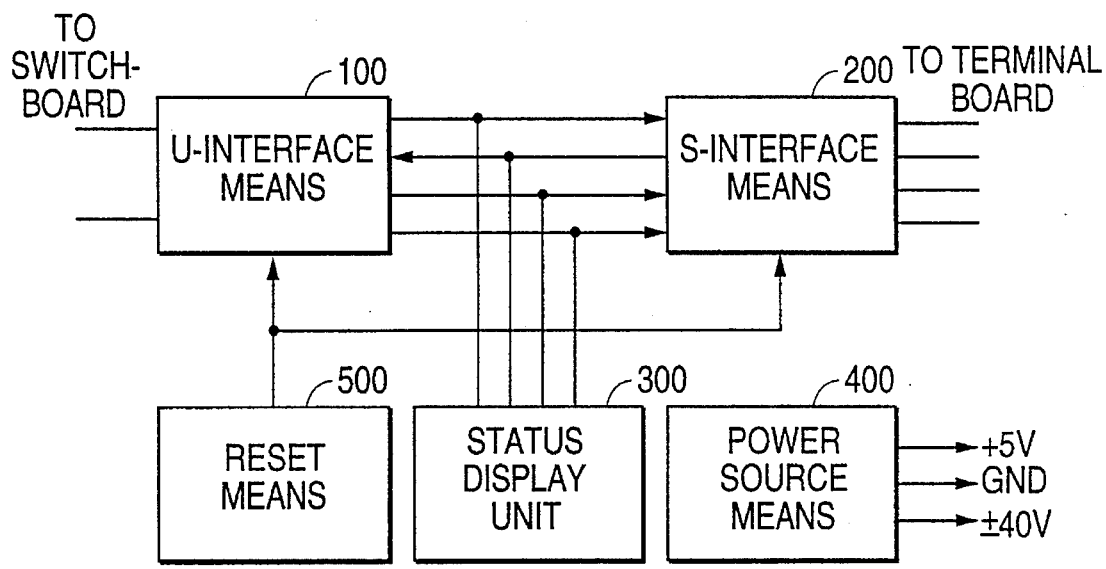
FIG. 1 shows a schematic block diagram of a network terminal apparatus according to the invention.

FIG. 1 shows a block diagram of a network terminal apparatus according to the invention. It includes U-interface means 100 serving to interface between subscribers and ISDN switchboard about data transmission format and exchanging 2B+D channel data at a reference rate, S-interface means 200 interfacing with subscribers's telephones, terminals, or the like and exchanging 2B+D channel data in accordance with CCITT proposed recommendation I.430, a status display unit 300 coupled between the U- and S-interface means for displaying the activation/non-activation status of the system components, power source supply means 400 for supplying power to the apparatus and users's terminals (not shown), and reset means 500 coupled between the U- and S-interface means for performing turning on and reset of the power and resetting operations.

Figure 2:
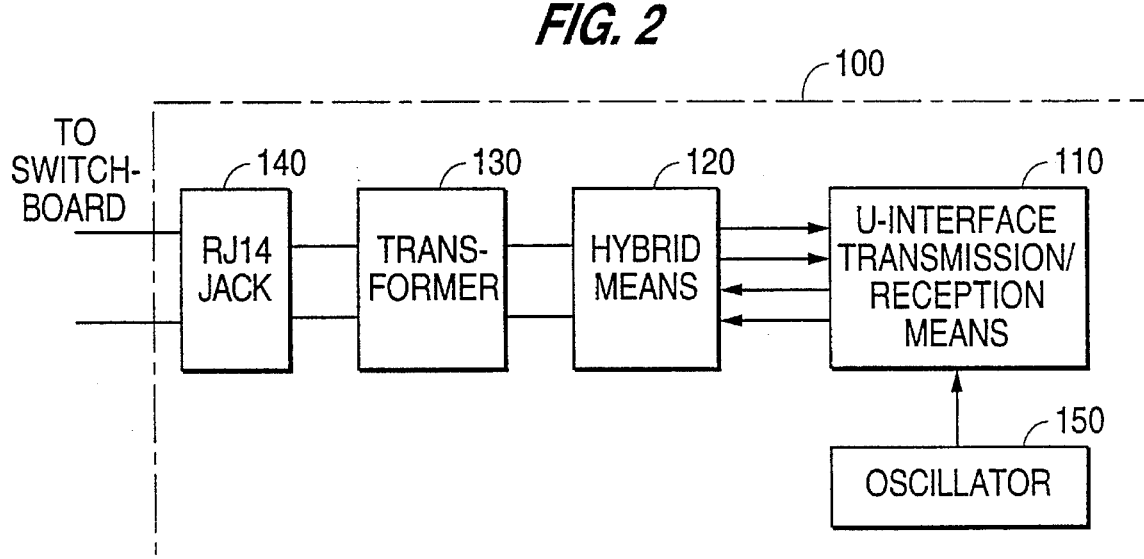
FIG. 2, 3, 4 and 5 are similar to FIG. 1, but showing U- and S-interface means, status display unit, and power source supply means, respectively, of FIG. 1 in detail.

The U-interface means 100 shown in FIG. 2 in detail executes activation/non-activation operations by the echo cancellation method. It comprises U-interface transmission/reception means 110 for exchanging data upon interfacing with the S-interface means 200, hybrid means 120 coupled to the U-interface transmission/reception means for converting the 4-wire data to 2-wire data and vice versa, a transformer 130 physically intermediated by the switchboard and having a hybrid-to-line winding ratio at 1 to 1.65 with a line impedance at 135 ohms, a RJ14 jack 140 physically connected to the switchboard, and an oscillator 150 for applying clock to the U-interface transmission/reception means 110 for synchronization.

Figure 3:
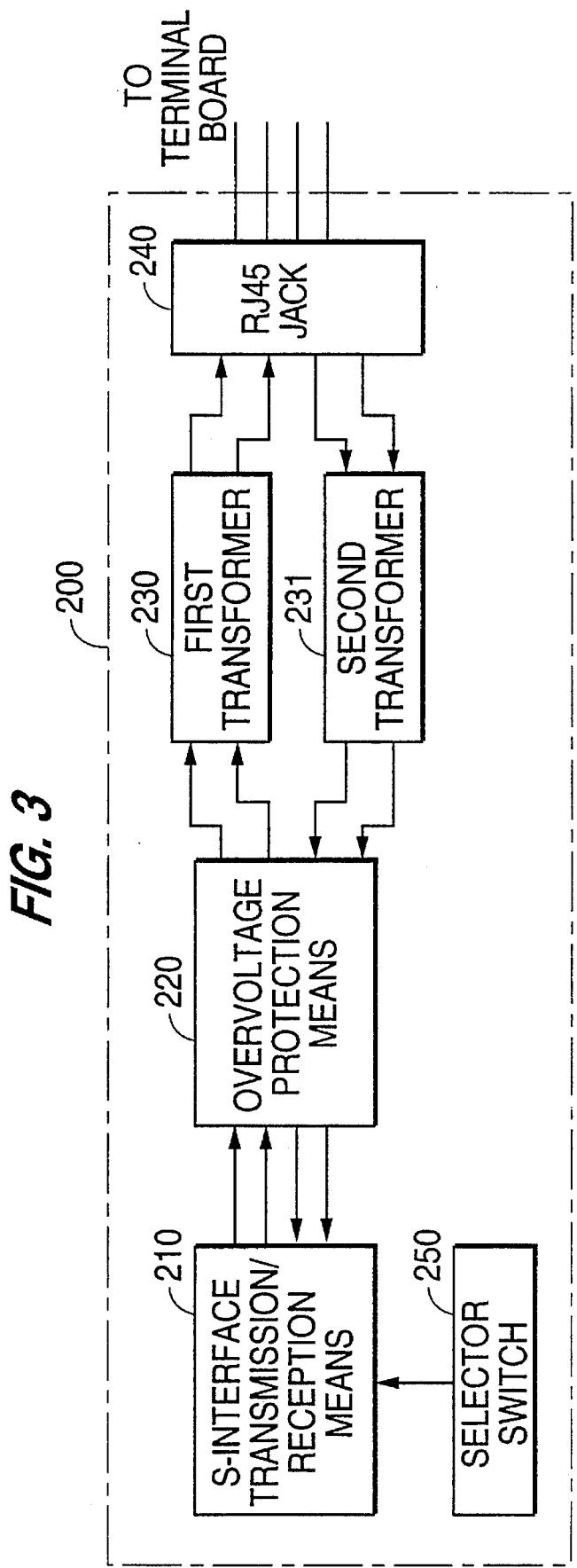

The S-interface means 200 shown in detail in FIG. 3 are connected either directly to a user's ISDN terminal or through a terminal adaptor to a non-ISDN terminal and execute data exchange in accordance with CCITT I.430. It comprises S-interface transmission/reception means 210 for executing the data exchange relative to U-interface, overvoltage protection means 220 coupled via 4 wires to the S-interface transmission/reception means 210 for protecting the latter against any voltage over a determined level, a first and second transformer 230 and 231 for data transmission and reception each having a winding ratio of the S-interface transmission/reception means to the line at 2 to 1 and supplying +/−40 V at the center tap, and RJ45 jack 240 coupled to the first and second transformers and via 4 wires directly to a terminal, and a point-to-point/point-to-multipoint selection switch 250 formed by a slide switch for allowing the user to select either system. It may be disposed outside of the apparatus.

Figure 4:
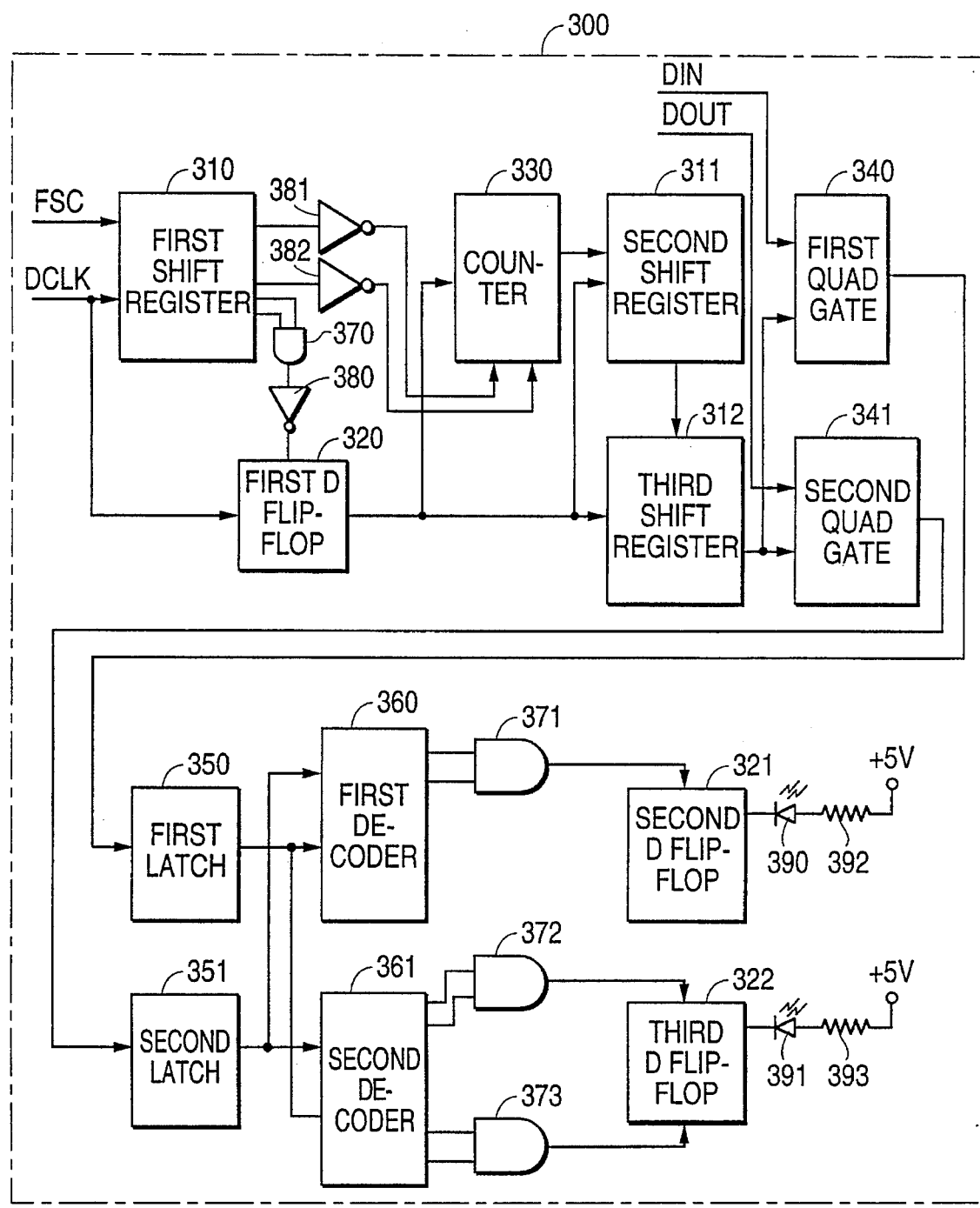

The status display unit 300 as shown in FIG. 4 in detail comprises three shift registers 310, 311 and 312, three D-flipflops 320, 321 and 322, a counter 330 and quad gates 340 and 341, latches 350 and 351, decoders 360 and 361, multipliers 370, 371,372 and 373, invertors 380, 381 and 382, light emitting diodes 390 and 391, and resistances 392 and 393.

FIG. 7 shows a timing chart of signals appearing in the unit 300 of FIG. 4, and loaded on a IOM-2 or ISDN Oriented Modular-2 bus. Data clock signal DCLK, and frame synchronism clock FSC, data signal DIN transmitted from a terminal to the switchboard and data signal DOUT transmitted in the opposite direction are shown at A, B, C, and D, respectively.

In operation, the first shift register 310 is applied with the frame synchronism signal FSC of line B of FIG. 7 (hereafter FIG. 7B) and the data clock signal DCLK of line A of FIG. 7 (hereafter FIG. 7A) by the U-interface transmission/ reception means 110 for execution of a determined shifting operation. The first D-flipflop acts as a clock upon application of the data clock signal DCLK in order to delay the output of the invertor 380 for a determined period of time. The multiplier 370 multiplies two outputs from the first shift register 310 and produces an output which is inverted by the invertor 380.

The counter 330 starts upon application of an output from the first D-flipflop 320 to count the output signal derived from the first shift register 310 and inverted by the two invertors 381 and 382. The second shift register 311 is applied with the output signals from the counter 330 and the first D-flipflop 320 for execution of a determined shifting operation. The third shift register 312 is applied with the output signals from the second shift register and the first D-flipflop 320 for execution of a determined shifting operation.

The first and second quad gates 340 and 341 are applied with data signals shown on line C of FIG. 7 (hereafter FIG. 7C) and line D of FIG. 7 (hereafter FIG. 7D) and the output signals from the third and the second shift registers 312 and 311 to monitor the status of the S- and U-interfaces, respectively. The first and second latches 350 and 351 temporarily store the outputs from the first and second quad gates, respectively. The first and second decoders 360 and 361 are applied with the signals latched by the first and second latches 350 and 351, respectively. The first decoder 360 has its outputs coupled to a first multiplier 371. Two multipliers 372 and 373 multiply the output signals from the second decoder 361. The second D-flipflop 321 has the reset terminal connected to the output signal from the multiplier 371 and the input terminal connected to the light emitting diode 390, and may execute an inputting operation for actuating the light emitting diode 390. The third D-flipflop 322 has the reset and preset terminals connected to the output signals from the multipliers 372 and 373 and the input terminal connected to the light emitting diode 391, and may execute an inputting operation on a basis of signals arriving at the reset and the preset terminals for actuating the light emitting diode 391.

The light emitting diodes 390 and 391 are actuated in accordance with the C/I channel data of line C of FIG. 7 (hereafter FIG. 7C) and line D of FIG. 7 (hereafter FIG. 7D). Specifically, when the status display unit receives an activation indication code data, "1100" for signifying the activation and an activation indication local loop code data, "1110" for signifying the loop back activation, the light emitting diodes 390 and 391 are turned on. When it receives any other than those codes, the light emitting diodes 390 and 391 are turned off. Thus, the status of the activation and non-activation of the U- and S-interfaces 100 and 200 can thus be presented by action of turning on and off the light emitting diodes 390 and 391.

Figure 5:
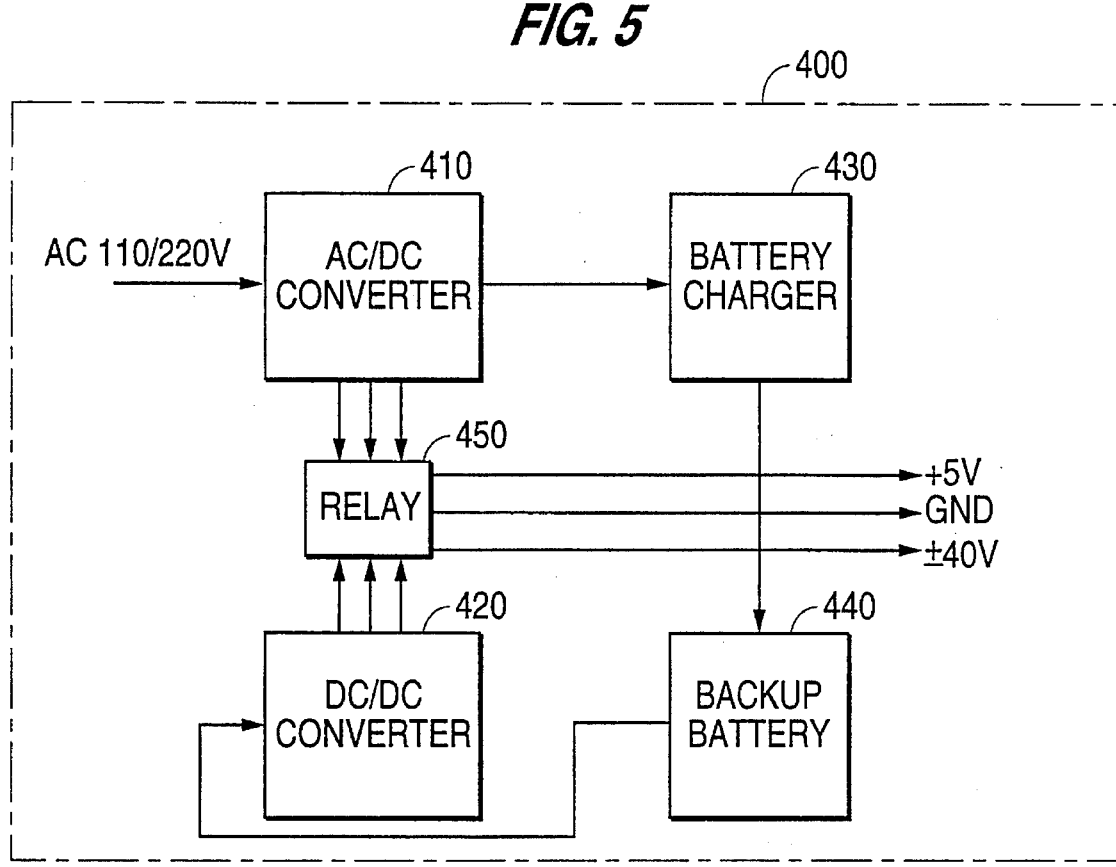

The power source supply means 400 shown in FIG. 5 in detail functions to supply regular power AC110/220 V and backup power upon stoppage of the regular power supply, and comprises an AC/DC convertor 410 supplied with the regular power to provide voltages DC+5 V and DC+40 V, and serving as a prevoltage machine to be operated without switch-over of 110/220 V, a battery charger 430 connected to the AC/DC convertor 410 and charging a backup battery 440 to be operated as a source for providing DC+5 V and DC+40 V upon stoppage of the regular power, a DC/DC convertor 420 for detecting a source in the backup battery upon stoppage of the regular power source, and a relay 450 acting to switch over the AC/DC convertor 410 and DC/DC convertor 420 for switching between the regular and backup power sources.

It is noted that at the time of switch over to the backup power source occurring for stoppage of the regular power source while a terminal is supplied with DC+40 V during the supply of regular power source, the power source supply means 400 supplies DC-40 V to a terminal for notifying the terminal of the status.

It is noted that the reset means 500 may be formed by conventional means such as resistance, condenser, diode, trigger invertor, and a mechanical pushbutton and can initialize the system at the time of power on or resetting.

In the 2 binary 1 quaternary line coding operation as shown in FIG. 6, the signal data is coded by 2 binary bits and then transmitted at 1 quaternary baud.

It can be understood that the apparatus embodied by the invention provides data of a reference rate by conversion to 2-wire data of the switchboard via the hybrid circuit in the U-interface means, and facilitates point-to-point/point-to-multipoint selection by the switch means coupled to the S-interface means, and that the power source unit ensures continuation of provision of the services during stoppage of the regular power source replacing the mesh power supply with the backup source. Thus, the provision of a point-to-point/point-to-multipoint selection switch outside of the system dispenses with use of a microprocessor for selection between the two types of terminals, to reduce cost of the system. The system devices may be implemented by application specific integrated circuits. The backup power source can keep providing the services after stoppage of regular power supply.

What is claimed is:

1. An ISDN network terminal apparatus comprising:
    a U-interface circuit for coupling to an ISDN switchboard and for executing transmission/reception therewith using two B-channels of data and one D-channel of data;
    an S-interface circuit for coupling to a terminal and for executing transmission/reception of data on said two B- and one D-channels said data exchange being carried out in accordance with a predetermined CCITT standard
    and wherein said U-interface circuit comprises:
        U-interface transmission/reception circuit for executing activation and non-activation activities by exchanging data with said S-interface circuit,
        a hybrid circuit coupled to said U-interface transmission/reception circuit for converting 4-wire signals on the terminal side to 2-wire signals on the switchboard side and vice versa,
        a transformer for coupling said hybrid circuit to a jack switchboard,
        said jack for coupling said transformer to said switchboard, and
        an oscillator for providing a predetermined clock pulse signal to said U-interface transmission/reception circuit for synchronizing the operation thereof,
    and wherein said S-interface circuit comprises:
        an S-interface transmission/reception circuit in said S-interface circuit for exchanging data with said U-interface circuit, an overvoltage protection circuit coupled via four wires to said S-interface transmission/reception circuit for protecting said S-interface transmission/reception circuit against voltages higher than a predetermined level which will damage the circuitry of the S-interface circuit, first and second transformers provided for transmission and reception of data and coupled to said S-interface transmission/reception circuit through said overvoltage protection circuit, a jack for physically coupling said first and second transformers to said terminal, and a selection switch coupled to said S-interface transmission/reception circuit for controlling whether point-to-point or point-to-multipoint terminal operation is desired.

2. The network terminal apparatus of claim 1 where said selection switch is a slide switch.

3. The network terminal apparatus of claim 1 further comprising:

a status display unit coupled between said U-interface circuit and said S-interface circuit for displaying activation and non-activation status for data transmission, power source supply circuit for supplying power to said terminal coupled to said S-interface circuit and for supplying said terminal with regular power during times when regular utility power is available and for supplying said terminal with backup power during times when regular utility power is not available, and a reset circuit coupled between said U- and S-interface circuits for causing said terminal apparatus to be reset at the time under predetermined conditions.

4. The network terminal apparatus of claim 3 where said status display unit comprises:

a first shift register for receiving a frame synchronism signal FSC and for receiving a data clock signal DCLK from said U-interface transmission/reception circuit, said first shift register for performing a shifting operation on said frame synchronism signal, a multiplier coupled to multiply two outputs from said first shift register to generate an output signal, an first inverter coupled to receive and invert said output signal from said multiplier, a first D-flipflop coupled to the output of said first inverter and coupled to receive said data clock signal at a clock input, and acting to clock the output of said first inverter through to an output upon receipt of said data clock signal DCLK in order to delay said output of said first inverter, a pair of inverters for inverting outputs of said first shift register, a counter coupled to receive the inverted output signals from said pair of inverters and coupled to receive the signal appearing at said output of said first D-flipflop as a gating signal controlling whether said counter does or does not count transitions in the inverted output signals from said pair of inverters, said counter starting to count, upon receipt of the output signal from said first D-flipflop, the output signal derived from said first shift register which has been inverted by said pair of inverters, a second shift coupled to receive the output signals from said counter and to receive said output signal from said first D-flipflop, said second shift register for shifting in time the output signal from said counter, a third shift register coupled to receive said output signals from said second shift register and coupled to receive the output of said first D-flipflop 320, said third shift register for shifting in time the output signal from said second shift register, a first quad gate coupled to receive data signals transmitted from said terminal to said ISDN switchboard and coupled to receive the output signals from said third shift register so as to monitor the status of said S-interface circuit, a second quad gate coupled to receive data signals transmitted from said switchboard to said terminal and coupled to receive the output signals from said third shift register, said second quad gate for monitoring the status of said U-interface circuit, first and second latches coupled to the outputs of said first and second quad gates, said first and second latches for temporarily storing the output signals from said first and second quad gates, first and second decoders coupled to receive the signals latched by said first and second latches, for executing decoding operations, a multiplier circuit coupled to outputs of said first and second decoders, for multiplying the output signals from said first and second decoders, said multiplier circuit comprised of first, second and third multipliers, said first multiplier coupled to a plurality of outputs from said first decoder, and said second and third mulitpliers each coupled to a plurality of outputs from said second decoder, and further comprised of a second D-flipflop having a reset terminal coupled to an output of said first multiplier, and further comprised of a first light emitting diode coupled to and activated by an output of said second D-flipflop upon reset by a reset signal generated by said first multiplier, and further comprising a third D-flipflop having reset and preset terminals connected to the output signals from said second and third multipliers, and a second light emitting diode coupled to the output of said third D-flipflop for lighting depending upon the state of said reset and preset signals.

5. The network terminal apparatus of claim 4 where said first and second decoders generate signals to turn on said first and second light emitting diodes upon receipt of a predetermined operation display code value and a predetermined operation display local loop code value.

6. The network terminal apparatus of claim 3 where said power source supply circuit comprises:

an AC/DC converter for converting regular AC110/220 V power source voltage to one or more D.C. voltages, a backup battery for supplying backup power if the regular power source fails, a rechargeable battery charger connected to said AC/DC converter to receive power therefrom and coupled to said backup battery for charging said battery such that said backup battery is useable as a backup power source upon stoppage of the regular power source, a DC/DC convertor coupled to said backup battery, for converting an output voltage from said backup battery to one or more DC voltages suitable for providing backup power upon failure of said main power source, and a relay connected to said AC/DC converter and to said DC/DC convertor for switching power connections intended for coupling to said terminal from said AC/DC converter to said DC/DC converter upon failure of the main power source.

* * * * *